United States Patent Office 3,069,205
Patented Dec. 18, 1962

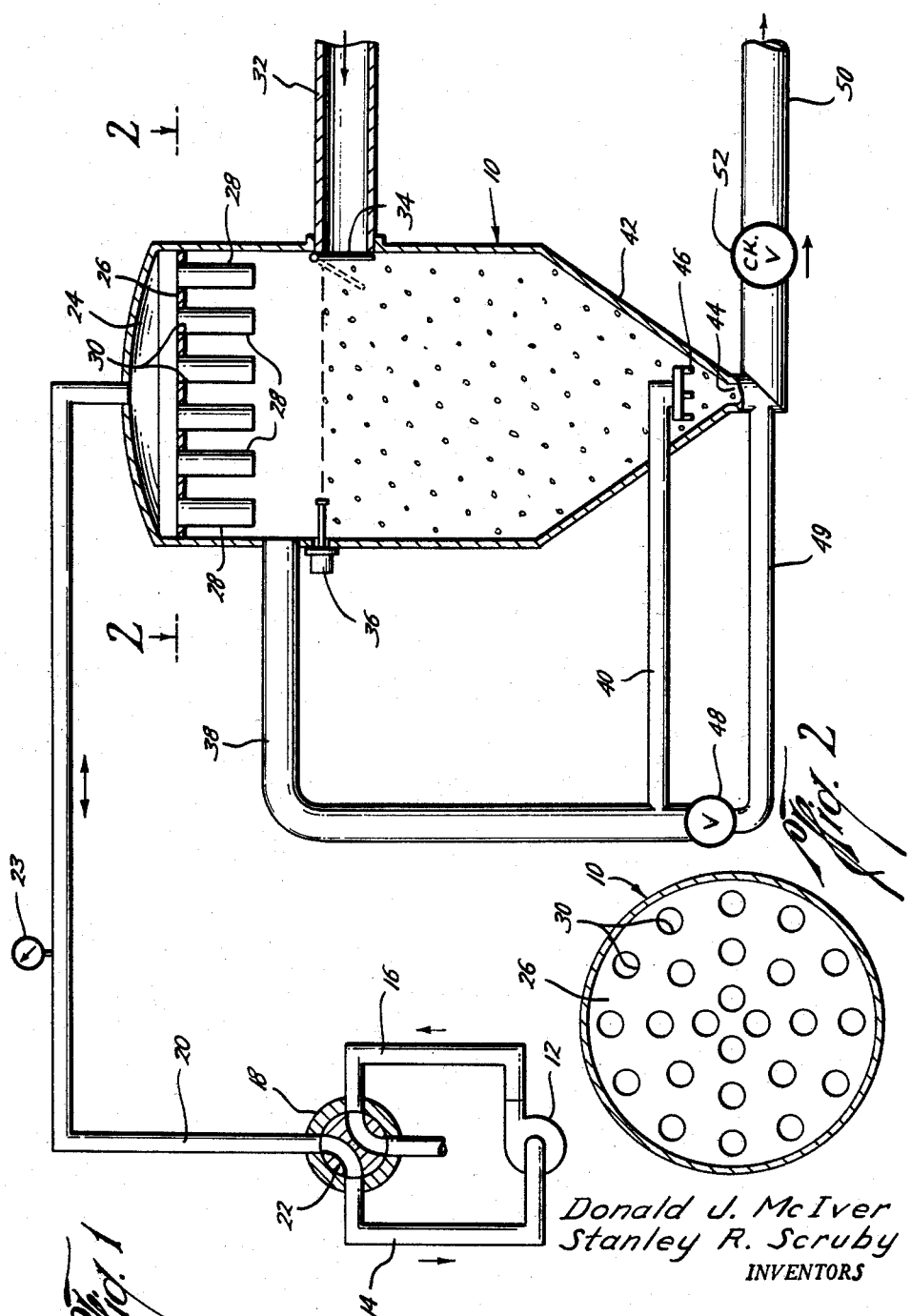

3,069,205
CONVEYING OF SOLIDS
Donald J. McIver and Stanley R. Scruby, Houston, Tex., assignors to Systems Engineering & Manufacturing Co., Inc.
Filed Dec. 3, 1959, Ser. No. 857,066
7 Claims. (Cl. 302—17)

This invention relates to novel means for conveying of solid materials, and particularly to means for moving dry granular or powdered solid materials from one location to another.

The handling of solids in large quantities is a major problem in many industries. When solid materials are to be moved to a lower level, they may often be moved by gravity. Normally, however, the movement of these materials is such that it must be transported in small batches, as in containers, or it must be blown through conduits by high velocity air. The entrainment of these materials in air is, however, often difficult, since it necessitates the use of equipment which can effectively mix the solids into the air stream. Such equipment has a very short life where abrasive materials are handled. Furthermore, such equipment is usually rather bulky, so that it cannot always be fitted into the necessary location. For example, railroad hopper cars unload at the bottom, and there is little clearance underneath them, so that the use of conventional equipment for entraining the solids in an air stream is impossible.

It is an object of this invention to provide novel apparatus for conveying granular or powdered solid materials.

It is another object of this invention to provide novel apparatus for vacuum unloading and pressure loading of containers.

Still another object is to provide novel apparatus for air conveying of granular and powdered solid materials.

These and other objects of the invention will become more apparent upon consideration of the following description and the accompanying drawing, wherein FIGURE 1 is a somewhat schematic layout of the apparatus of this invention, parts being shown in section for clarity, and FIGURE 2 is a horizontal sectional view of a portion of the apparatus, taken at line 2—2 of FIGURE 1.

The apparatus of this invention comprises generally a pressure tight material transfer container 10 and associated equipment for cooperative loading and unloading of the material transfer container. Thus means are provided for changing the pressure in container 10, one embodiment of such means being for example a blower 12 or other air compressing means. Blower 12 is connected to container 10 in such a way that it can cause a flow of air into the container, and thus produce a positive pressure therein, or withdraw air therefrom, and thus produce a vacuum therein. A suction pipe 14 and a discharge pipe 16 are each connected to the suction and discharge respectively of blower 12, and are each connected to flow control means comprising a four-way valve 18. An air supply conduit 20 in communication with an upper portion of container 10 is in communication with a first port of valve 18. Suction pipe 14 is in communication with a second port of valve 18, discharge pipe 16 is in communication with a third port, and the fourth port communicates with the atmosphere. Valve 18 is fitted with a core 22 which may be rotated to change the direction of flow of air through conduit 20. With core 22 in the position shown in the drawing, conduit 22 is in communication with the suction side of blower 12. It will be apparent that at the other position of core 22, conduit 20 will be in communication with the discharge side of blower 12. Pressure switch 23 which communicates with conduit 20 and container 10 comprises a portion of the means for actuating valve 18.

Air supply conduit 20 communicates with an upper portion of container 10 wherein an air chamber 24 is defined by a bulkhead 26. Filtering means are provided between air chamber 24 and the remainder of container 10, and such means comprise a plurality of filter bags 28 fitted in apertures 30 in bulkhead 26. Container 10 is provided with means for admitting solid materials thereto, such means comprising a conduit 32, and a check valve 34 at the point of entry of conduit 32 into container 10, the check valve being adapted to allow flow into container 10 from conduit 32, and to prevent flow from container 10 into conduit 32.

A level control 36 is affixed to container 10 in a manner to be actuated by the level of solid material in the container. The level control in turn actuates valve 18 as hereinafter described.

Above level control 36 and below the filtering means an air outlet conduit 38 communicates with the interior of container 10. A branch conduit 40 from conduit 38 leads into the lower portion 42 of container 10, lower portion 42 being in the form of an inverted cone, so that the container functions as a hopper, and being provided with a solid material outlet 44 at its lowermost point. Conduit 40 is provided with a plurality of downwardly directed nozzles 46, which comprise means for urging solid materials in lower portion 42 toward and through material outlet 44. In an embodiment of the invention, a valve 48 is provided in conduit 38 below branch conduit 40. Conduit 38 then, usually with reduced diameter 49, leads to communication in axial alignment with a material discharge conduit 50 which extends transversely of material outlet 44, whereby air flowing into conduit 50 from conduit 49 entrains solid materials flowing into conduit 50 from material outlet 44. Discharge conduit 50 is connected to material outlet 44 to receive solid materials therefrom. A check valve 52 in conduit 50 allows flow therethrough in a direction away from container 10, and prevents flow through conduit 50 toward container 10.

The entire apparatus of this invention may be mounted on a truck bed or on a trailer, or it may be a permanent installation. In either event, solid material inlet conduit 32 will be connected to a source of granular or powdered solid material, such as for example to the outlet from a railroad hopper car. It will readily be seen that an adapter of relatively small dimensions may be attached to the hopper outlet, and conduit 32 attached thereto, as by means of a hose or other flexible conduit.

In operation, blower 12 operates to supply a vacuum to fill container 10, or a pressure to empty container 10. With valve core 22 at the position shown in the drawing, blower 12 is pulling air through conduit 20, thereby inducing a vacuum in container 10. Check valve 52 is thereby closed and check valve 34 is opened, so that solid material is pulled into the container through conduit 32. It will be appreciated that conduit 32 acts similarly as a household vacuum cleaner, so that bins and other containers may be emptied of granular or powdered materials by lowering the end of conduit 32 thereinto. Granular material up to one-half inch or larger may be handled in this way. Filter bags 28 prevent solid material from being carried through conduit 20 into the blower.

The vacuum is maintained in container 10 until the solid material in the container reaches the level shown in the drawing. At this level, it actuates level control 36, which in turn operates valve 18 to turn it ninety degrees. It will readily be seen that the blower will now take suction from the atmosphere, and will discharge air under pressure into conduit 20. This air under pressure flows into air chamber 24 and through filter bags 28, so that dust accumulated on the bags during the filling operation is blown off them during the emptying operation. The pressure imposed on container 10 causes check valve 34 to close, and, through conduits 38 and 49, causes check valve 52 to open. Where used, valve 48 is adjusted to proportion the flow of air as necessary between branch conduit 40 and conduit 49 to obtain the most efficient discharge of solid material. It will be apparent that, in a permanent installation where the same material is handled at all times, conduits 40 and 49 will be designed to the proper proportions, so that valve 48 is not necessary.

Air passing through branch conduit 40 is discharged therefrom through nozzles 46, thereby agitating the solid material at the lower end of the container and causing it to flow into conduit 52. Here, air discharged through conduit 49 entrains the solid material and carries it to its destination. The pressure in the container on top of the solid material assists in the expulsion of the material from the container. This emptying process continues until container 10 is emptied. The emptying of the container causes a substantial drop in pressure in the container, as well as in conduit 20. The reduction in pressure actuates pressure switch 23, which in turn operates valve 18 to turn its core 90 degrees, so that a vacuum is again imposed on the system, and the filling portion of the process is repeated.

It will readily be seen that novel apparatus has been provided for the efficient and rapid transfer of solid materials from one location to another. The apparatus may be used to empty containers which have relatively inaccessible openings, such as railroad hopper cars, or to empty bins and other containers which have no bottom openings. Filtering means are provided to prevent damage to the air compressor or blower which supplies the pressure or vacuum to operate the apparatus, and the filtering means is cleaned without the necessity of a separate cleaning operation. The invention allows the use of a single means for providing both pressure and vacuum for emptying and filling the material transfer container. Furthermore, the filling and emptying are made automatic, so that it is not necessary to have a man watch the unit to determine when the material transfer container is full or emtpy.

Any air compressing means capable of obtaining the desired pressure and vacuum may be used. It will be apparent that comparatively low pressures and vacuums, e.g., 5 p.s.i.g. pressure or 5 inches of mercury vacuum, may be used, but that the capacity of the apparatus is greatly increased if a large pressure differential is used.

The invention is not limited to the specific embodiments shown and described herein, but only as defined by the following claims.

We claim:
1. Solid material conveying apparatus comprising a vertical container comprising an upper air chamber portion and a lower hopper portion, a bulkhead intermediate said air chamber portion and said hopper portion, and filtering means in said bulkhead adapted to prevent the flow of solid materials therethrough and to allow the flow of air therethrough; an air supply conduit in communication with said air chamber; pressure changing means having a suction pipe and a discharge pipe adapted to change the pressure in said container and said air supply conduit; a four-way valve intermediate said pressure changing means and said air supply conduit, a first port in said valve in communication with said air supply conduit, a second port in said valve in communication with said suction pipe, a third port in said valve in communication with said discharge pipe, and a fourth port in said valve in communication with the atmosphere; a conduit communicating with said container at a point below said bulkhead for admitting solid materials to said container; a solid material outlet in the hopper portion of said container; a discharge conduit extending transversely of said solid material outlet and in communication therewith; level control means attached to said container intermediate said bulkhead and said hopper portion adapted to actuate said four-way valve to communicate said first port with said third port and said second port with said fourth port in response to the accumulation of solid materials in said container to a predetermined level; and pressure operable means in communication with said air supply conduit adapted to actuate said four-way valve to communicate said first port with said second port and said third port with said fourth port in response to a decrease in the pressure in said container.

2. Solid material conveying apparatus as defined by claim 1 and including an air outlet conduit communicating with said container intermediate said bulkhead and said level control means and communicating with said discharge conduit in axial alignment therewith; a branch conduit extending from said air outlet conduit to within the hopper portion of said container and above the solid material outlet; and a plurality of downwardly directed nozzles on the portion of said branch conduit above the solid material outlet.

3. Solid material conveying apparatus comprising a vertical container comprising an upper air chamber portion and a lower hopper portion; filter means intermediate said air chamber portion and said hopper portion; an air supply conduit in communication with said air chamber; pressure changing means, having a suction pipe and a discharge pipe, adapted to change the pressure in said container and said air supply conduit; a four-way valve intermediate said pressure changing means and said air supply conduit, a first port in said valve in communication with said air supply conduit, a second port in said valve in communication with said suction pipe, a third port in said valve in communication with said discharge pipe, and a fourth port in said valve in communication with the atmosphere; a solid material inlet conduit communicating with said container at a point below said filter means; a solid material outlet conduit communicating with said hopper portion at a point below said solid material inlet conduit; level control means attached to said container intermediate said filter means and said hopper portion adapted to actuate said four-way vale to communicate said first port with said third port and said second port with said fourth port in response to the accumulation of solid materials in said container to a predetermined level; and pressure operable means in communication with said air supply conduit adapted to actuate said four-way valve to communicate said first port with said second port and said third port with said fourth port in response to a decrease in the pressure in said container.

4. Solid material conveying apparatus as defined by claim 3 and including a discharge conduit in communication with said material outlet conduit, and an air outlet conduit communicating with said container intermediate said filter means and said predetermined level and communicating with said discharge conduit at a point adjacent the point of communication of said discharge conduit with said material outlet conduit.

5. Solid material conveying apparatus as defined by claim 4 and including a branch conduit extending from said air outlet conduit to within the hopper portion of said container and above the solid material outlet; and a plurality of downwardly directed nozzles on the portion of said branch conduit above the solid material outlet.

6. Solid material conveying apparatus comprising a vertical container having an upper air chamber portion and a lower hopper portion; filter means intermediate said air chamber portion and said hopper portion; an air supply conduit in communication with said air chamber; pressure changing means adapted to change the pressure in said container and said air supply conduit; flow control means operably associated with said air supply conduit and said pressure changing means adapted to selectively control the direction of air flow through said air conduit upon actuation of said flow control means; a solid material inlet conduit communicating with said container at a point below said filter means; a solid material outlet conduit communicating with said hopper portion at a point below said solid material inlet conduit; level control means attached to said container intermediate said filter means and said hopper portion adapted to actuate said flow control means to cause air to flow through said air supply conduit and said filter means into said hopper portion upon the accumulation of solid materials in said container to a predetermined level; and pressure operable means in communication with said air supply conduit adapted to actuate said flow control means to cause air to flow from said container through said filter means and said air supply conduit in response to a decrease in the pressure in said container below a predetermined pressure.

7. Solid material conveying apparatus comprising a container having an air chamber portion and a hopper portion; filter means intermediate said air chamber portion and said hopper portion; an air supply conduit in communication with said air chamber; pressure changing means communicating with said air supply conduit and adapted to change the pressure in said container and said air supply conduit; flow control means operably associated with said air supply conduit and said pressure changing means adapted upon actuation thereof to selectively cause the pressure changing means to change the pressure in said air supply conduit from positive to negative and from negative to positive; a solid material inlet conduit communicating with said container at a point below said filter means; a solid material outlet conduit communicating with said container at a point below said solid material inlet conduit; first level control means attached to said container adapted, upon accumulation of solid materials in said container to a first predetermined level, to actuate said flow control means to cause said pressure changing means to change the pressure in said air supply conduit from negative to positive so as to cause air to flow from said air supply conduit through said filter means and into said hopper portion whereby solid materials collected on said filter means are removed therefrom and solid materials are discharged from said container through said solid material outlet conduit; second level control means adapted, upon decrease in the level of solid materials in said container to a second predetermined level, to actuate said flow control means to cause said pressure changing means to change the pressure in said air supply conduit from positive to negative so as to cause air to flow from said container through said filter means and into said air supply conduit, whereby solid materials are drawn into said container through said solid material inlet conduit.

References Cited in the file of this patent

UNITED STATES PATENTS

| | | |
|---|---|---|
| 1,935,843 | Goebels | Nov. 21, 1933 |
| 2,221,741 | Vogel-Jorgensen | Nov. 12, 1940 |
| 2,276,805 | Tolman | Mar. 17, 1942 |
| 2,413,479 | Wiegand | Dec. 31, 1946 |

FOREIGN PATENTS

| | | |
|---|---|---|
| 1,110,035 | France | Oct. 5, 1955 |